US008689185B1

(12) United States Patent
Myers et al.

(10) Patent No.: US 8,689,185 B1
(45) Date of Patent: Apr. 1, 2014

(54) SYSTEM AND METHOD FOR PROCESSING ELECTRONIC DATA (75) Inventors: James F. Myers, San Antonio, TX (US); Larry W. Clark, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1536 days.

(21) Appl. No.: 11/044,333

(22) Filed: Jan. 27, 2005

Related U.S. Application Data (60) Provisional application No. 60/539,386, filed on Jan. 27, 2004.

(51) Int. Cl.
*G06F 9/44* (2006.01)

(52) U.S. Cl.
USPC ........... 717/124; 717/125; 717/126; 717/127; 717/128; 717/130

(58) Field of Classification Search
USPC .......... 717/124, 125, 126, 127, 128, 130, 131
See application file for complete search history.

(56) References Cited

U.S. PATENT DOCUMENTS

| 5,019,963 | A | * | 5/1991 | Alderson et al. | 707/201 |
| 5,712,971 | A | * | 1/1998 | Stanfill et al. | 714/34 |
| 6,199,171 | B1 | * | 3/2001 | Bossen et al. | 714/2 |
| 6,259,707 | B1 | | 7/2001 | Dara-Abrams et al. | |
| 6,289,382 | B1 | * | 9/2001 | Bowman-Amuah | 709/226 |
| 6,389,464 | B1 | | 5/2002 | Krishnamurthy et al. | |
| 6,845,499 | B2 | * | 1/2005 | Srivastava et al. | 717/116 |
| 6,895,409 | B2 | * | 5/2005 | Uluakar et al. | 717/104 |
| 7,194,737 | B2 | * | 3/2007 | Amodio et al. | 717/173 |
| 7,562,351 | B2 | * | 7/2009 | Haas et al. | 717/127 |
| 2002/0091991 | A1 | * | 7/2002 | Castro | 717/106 |
| 2004/0254962 | A1 | * | 12/2004 | Kodama et al. | 707/201 |
| 2004/0254964 | A1 | * | 12/2004 | Kodama et al. | 707/204 |
| 2004/0268267 | A1 | * | 12/2004 | Moravcsik | 715/821 |
| 2005/0261914 | A1 | * | 11/2005 | Brookins | 705/1 |

OTHER PUBLICATIONS

Smith, L. B. "A Comparison of Batch Processing and Instant Turnaround", 1967, ACM, p. 495-500.*
Schatzoff, et al. "An Experimental Comparison of Time Sharing and Batch Processing", 1967, ACM, p. 261-265.*

* cited by examiner

*Primary Examiner* — Qamrun Nahar
(74) *Attorney, Agent, or Firm* — Brooks, Cameron & Huebsch, PLLC (57) ABSTRACT

In one embodiment, a method of batch processing electronic data is provided. The method includes identifying one or more batch processing features common to a plurality of batch processing applications. The method also includes defining software code for managing execution of the common batch processing features, integrating the software code into at least one of the batch processing applications, and defining and taking one or more checkpoints. Moreover, the method includes retrieving input data in response to control data, processing at least a portion of the input data, determining the time of an error in response to the error during processing, retrieving data stored at the most recent one of the checkpoints, and processing at least a portion of the retrieved checkpoint data.

22 Claims, 6 Drawing Sheets

Fig. 5

SYSTEM AND METHOD FOR PROCESSING ELECTRONIC DATA

CROSS REFERENCE TO RELATED APPLICATIONS

This application claims priority to co-assigned U.S. Provisional Patent Application No. 60/539,386, filed Jan. 27, 2004, entitled BATCH ARCHITECTURE, naming Myers, et al. as inventors, which is incorporated herein by reference in its entirety.

BACKGROUND

This description relates generally to electronic data processing and, more particularly, to a system and method of integrating one or more processing features into a data processing application.

Complex business processes require a plurality of processing applications designed to collect and process data. Such applications ensure that the integrity of electronic data is maintained. Known techniques typically require separate coding of each supporting processing application. Each application must be individually tested and debugged.

What is needed is a system and a method for processing electronic data without the disadvantages discussed above.

SUMMARY

Accordingly, in one embodiment, a method of processing electronic data is provided. The method provides for defining software code for managing execution of one or more processing features associated with a plurality of data processing application. The method also provides for integrating the software code into one or more of the processing applications.

DETAILED DESCRIPTION

The present disclosure is herein described as a system and method of processing electronic data. Although the embodiments are illustrated below in the context of providing insurance products, present disclosure may be utilized in conjunction with any number of business processes and products.

Figure 1:
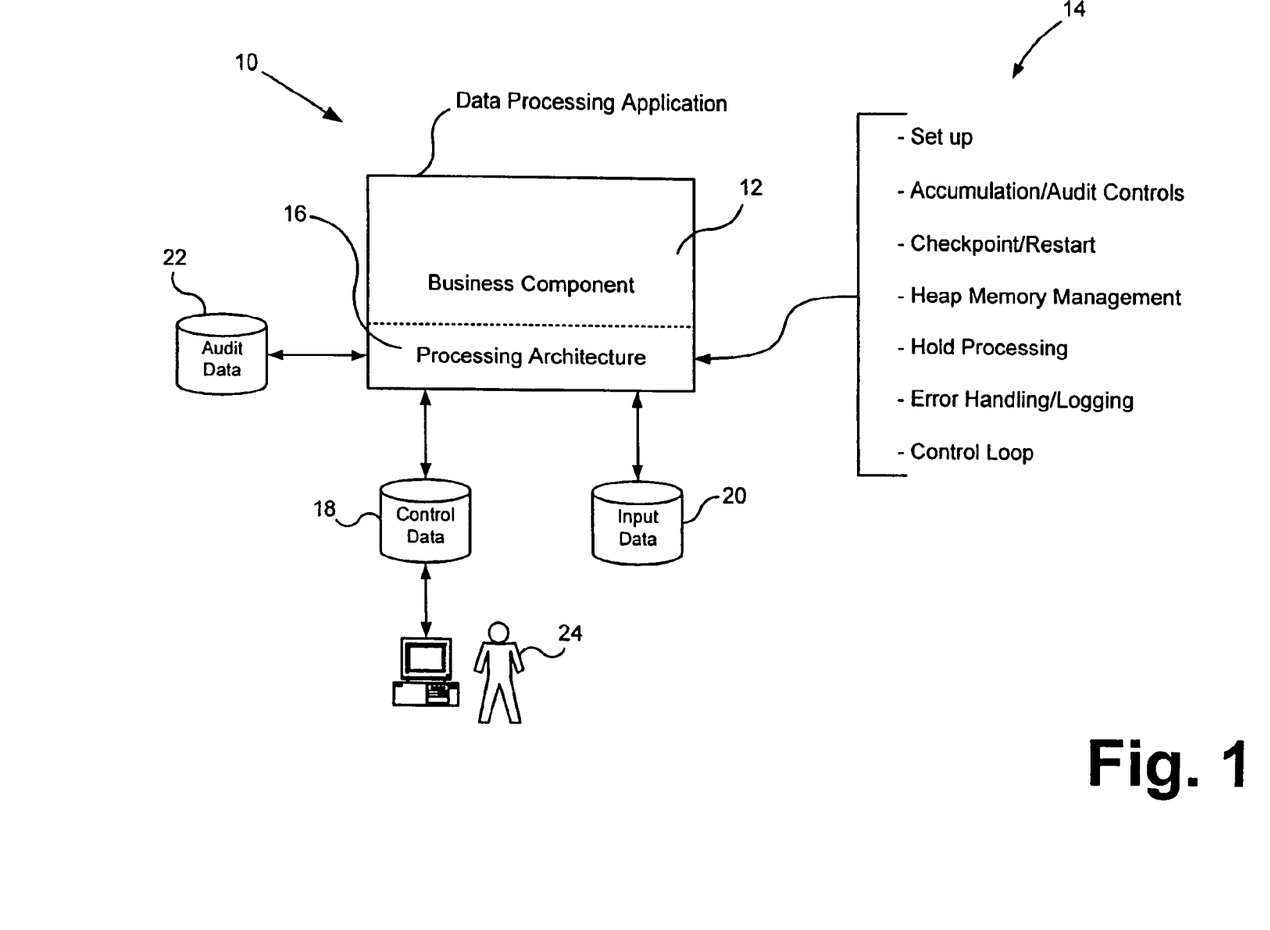
FIG. 1 is a block diagram of components of a system, according to an illustrative embodiment.

FIG. 1 is a block diagram of a data processing system/application 10. In one embodiment, the data processing application/system includes at least one business component 12 capable of initiating one or more business processes. In one embodiment, a software application is designed to execute computer code directed to a particular business process. In one example, a business process is defined as any software driven processing for conducting business activities and/or manipulating electronic information relating thereto.

Given the complexity of today's software applications, the business component often invokes the services of other software applications. Such applications are generally utilized to execute and/or facilitate the execution of actions ancillary to the overall business process. For example, business components are routinely required to enlist the services of a batch processing application for the purpose of processing accumulated data.

Today's business environment requires an organization to offer a plurality of business processes and products in order to remain competitive. Known batch processing techniques are costly and inefficient, typically requiring each batch application to be individually coded and tested for use with each business process at issue.

This is addressed by identifying one or more batch processing features (14) required to service one or more business processes. In one embodiment, a list of "common" batch processing features is generated by analyzing the requirements of any given set of business processes. In this manner, the present disclosure identifies those batch processing features which are capable of being applied to multiple business processes and/or data processing applications.

Software code is defined for use in providing efficient batch processing functionality. In one embodiment, non-specific business process programming is utilized to allow for easy utilization of software code by a multitude of business processes/components. In one embodiment, software code is defined for multiple batch processing features and is combinable into one "unit" to form a batch processing architecture 16. This architecture is capable of being tested and debugged as a whole, thus, further increasing efficiency.

All or part of the processing architecture is usable by the business process/component to perform batch processing of accumulated data. In one embodiment, the processing architecture of the present disclosure is capable of being integrated with the business component to form an overall data processing application/system. In one embodiment, object-oriented techniques are utilized to define the capabilities of the batch architecture.

In one embodiment, the common processing features provided by the batch architecture include, but are not limited to, profile set up, accumulation controls, audit controls, checkpoint processing, checkpoint processing for restart, heap memory management, hold processing, error handling, processing control loop, and/or error logging. Any combination of common processing features is capable of being incorporated into the unique processing architecture, as dictated by the scope and purpose of the data processing application/system at issue.

The profile set up feature includes software code designed to configure any user profiles as well as provide for the name and number of each specific batch processing job to be executed. The accumulation control and audit control batch processing features include software code designed to maintain and verify accumulation and control values. Further, basic functionality such as the number of input data records processed, input data records to be held, and error counts are provided by this software-driven batch processing feature.

The checkpoint processing feature includes software designed to persist any database updates made since the most recent (i.e., last) checkpoint to one or more storage devices. Such processing feature also clears buffers of one or more data processing application/system. Checkpoints also provide a point in processing that can be used to restart the program in the event of error or shut down. The checkpoint processing for restart feature of the present disclosure provides software for this purpose. Such restarts are typically performed to continue processing after an abnormal and/or premature shutdown of the batch processing program. In one embodiment, the software of the checkpoint processing feature is also designed to manage checkpoints including memory allocation, mirroring functionality, restoration after rollback, and data synchronization for restart.

The heap memory management feature includes software code designed to periodically recover heap memory during processing to prevent available memory from being exhausted, thus preventing abnormal processing terminations. The hold processing feature includes software code designed to defer the processing of certain sets of input data. In the case of an organization having a plurality of members, hold processing functionality may be utilized to defer or delay processing of a particular member's data, as described in more detail below.

The error handling/logging processing feature dictates how processing errors will be addressed as well as how data relating thereto will be stored. In one embodiment, the error handling/logging feature is capable of being utilized to determine the cause of an error, determine whether processing shall be halted due to any given error, determine the type of error at issue, and/or set forth storage parameters for each error condition. The control loop processing feature of the present disclosure includes software code designed to interact with the business component and/or the data processing application/system.

In one embodiment, the software code of the control loop feature is designed to retrieve input data for batch processing until no input data remains. In one embodiment, the control loop feature is also designed to invoke other batch application services including accumulation/audit controls, memory management, hold processing, error handling, check point control, and the initiation of input data processing.

In one embodiment, the data processing application/system and, particularly, the processing architecture include access to any number of data retrieval and storage devices. In one embodiment, control data, input data, and audit data storage devices are provided (18, 20, and 22, respectively).

As discussed above, the software code defining the operation of each common processing feature is non-business process specific (i.e., generic), in order to enable the architecture to interact with a greater number of data processing applications. Notwithstanding this, there may be instances where a business process or a batch application indicates its own particular approach to handling one or more aspects of the batch processing operation. In this example, the object-oriented software code may be overridden to suit the individual program's requirements.

One embodiment allows control data, as well as individual control cards, to be overridden by one or more users 24 through a graphic user interface. This feature of the present disclosure allows the processing architecture to successfully integrate into any number of batch processing applications Once integrated into the data processing application/system, the processing architecture operates in conjunction with the business component to retrieve and process input data. In one embodiment, one or more depositories of control data are utilized. Such control data defines the operation of one or more of the processing features offered by the system.

In one embodiment, the control data provides the system with direction as to which input data sets will be retrieved for processing. Further, default data handling parameters are capable of being defined by the control data to assist the application in dealing with various processing issues. For example, control data guides in issues such as how errors ought to be processed, where error data is to be stored, etc.

In one embodiment, control data is provided to the system via control records (e.g., control cards). In this embodiment, control cards refer to data files that are available at run time to provide control information to the processing architecture and/or the overall data application. In one embodiment, control card data files are created using an editable unnumbered data set. The usage of control data at run time allows the system to reduce long term maintainability problems associated with hard coded data parameters.

Figure 1A:
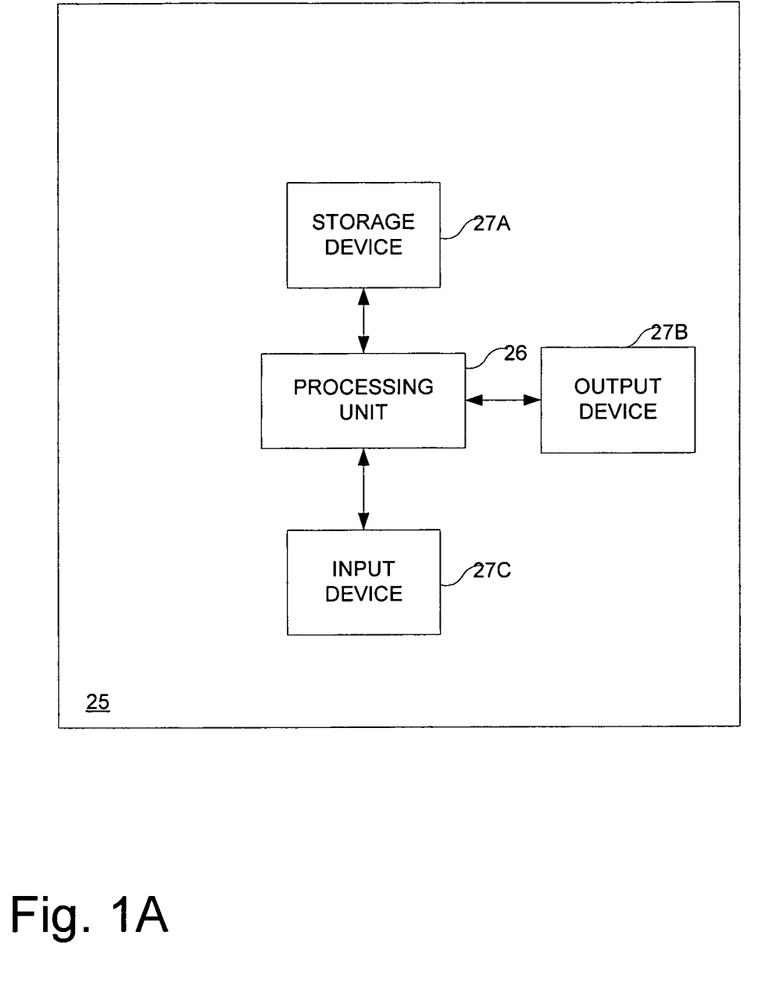
FIG. 1A is a block diagram of an information handling system, according to an illustrative embodiment.

FIG. 1A is a block diagram of an information handling system ("IHS"), indicated generally at 25, included by the system of FIG. 1. In one example, one or more IHSs, substantially similar to the IHS 25, execute the various processes discussed in more detail below (in connection with FIGS. 2, 3, 4, and 5). Examples of IHSs include mainframe computers, personal computers, handheld computers, and any other system that handles information.

The IHS 25 includes a processing unit 26 for executing instructions. The IHS 25 also includes a storage device (e.g., a memory or a disk drive) 27A, an output device (e.g., a display device or a print device) 27B, and an input device 27C, each of which is coupled to the processing unit 26

Figure 2:
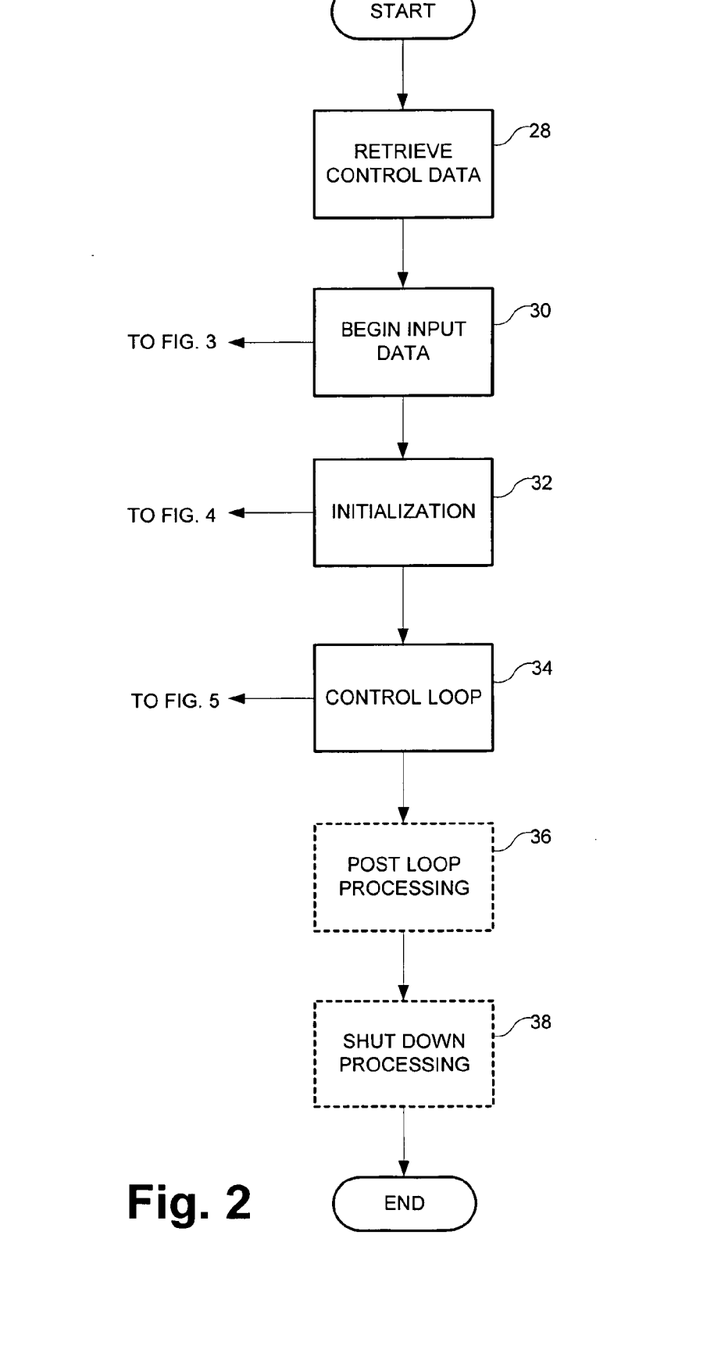
FIG. 2 is a flow chart of operations of a first process executed by the system of FIG. 1.

FIG. 2 is a flow chart of operations of a first process executed by the system of FIG. 1, according to an illustrative embodiment. In FIG. 2, one or more methods for performing the operations of various steps are capable of being overridden as discussed in more detail below. Such steps are indicated by dotted boxes.

The operation begins at a step 28, where the system retrieves control data. In one example, the system retrieves such control data via retrieving a control record (e.g., a control card), and such control data identifies input data that is specified for retrieval. After the step 28, the operation continues to a step 30.

At the step 30, the system begins input data. Operations performed at the step 30 are discussed in more detail below in connection with FIG. 3. After the step 30, the operation continues to a step 32.

At the step 32, the system performs initialization. Operations performed at the step 32 are discussed in more detail below in connection with FIG. 4. After the step 32, the operation continues to a step 34.

At the step 34, the system performs a control loop processing. The control loop processing is a primary program instance processing loop, which continues until the system has exhausted all triggers. The control loop is discussed in more detail below in connection with FIG. 5. After the step 34, the operation continues to a step 36.

At the step 36, the system performs post loop processing. The system performs such post loop processing after the system has exhausted all triggers by performing the control loop processing. After the step 36, the operation continues to a step 38.

At the step 38, the system performs a shut down process. By performing the shut down process, the system ends the program instance in an unconventional (e.g., unusual or non-standard) manner. After the step 38, the operation ends as shown in FIG. 2.

Figure 3:
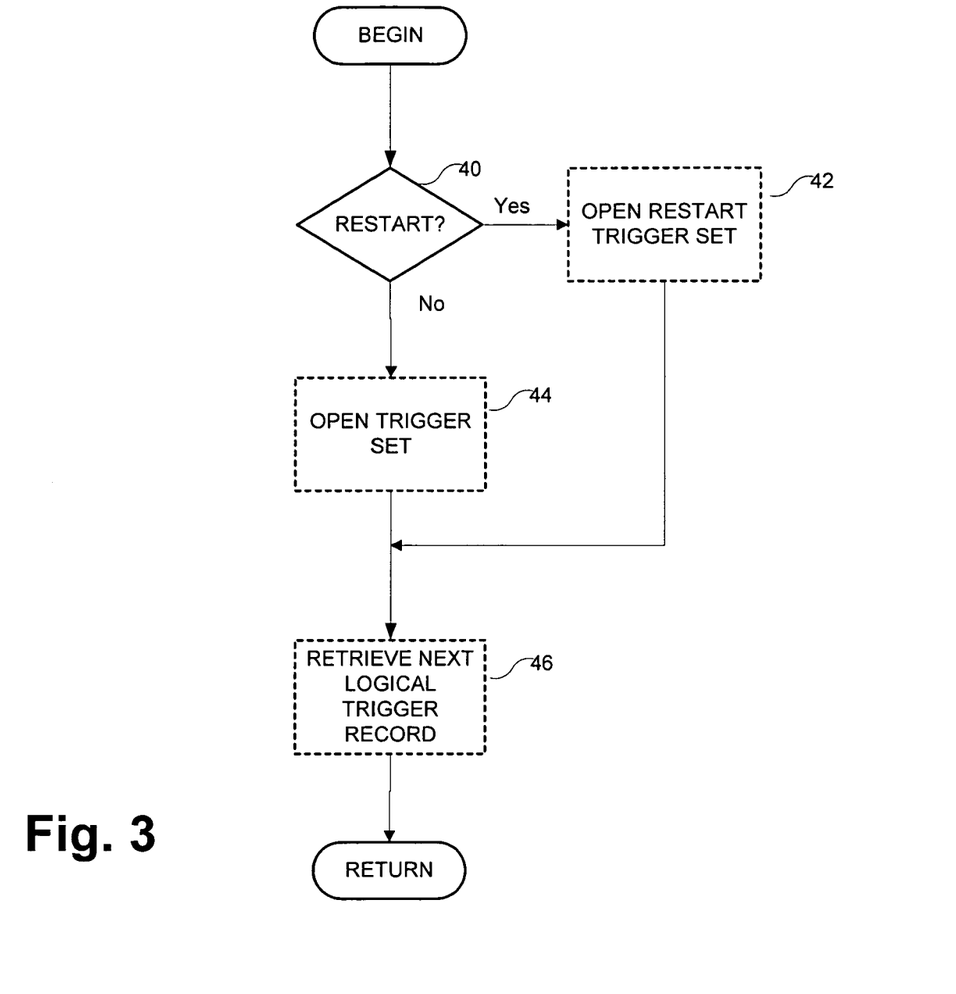
FIG. 3 is a flow chart of operations of a second process executed by the system of FIG. 1.

FIG. 3 is a flow chart of operations of a second process (i.e., the begin input data process discussed above) executed by the system of FIG. 1, according to an illustrative embodiment. In FIG. 3, one or more methods, for performing the operations of various steps, are capable of being overridden as discussed in more detail below. Such steps are indicated by dotted boxes.

The operation begins at a step 40, where the system determines whether it has detected a restart condition. The system determines as such when calendared event input or relational table input (e.g., a DB2 relational table input) is used, and in response to a rollback or a restart of an abnormally terminated process. By comparison, the system determines that it does not detect a restart condition in response to a normal start. If the system detects a restart condition, the operation continues to a step 42.

At the step 42, the system opens a restart trigger set. In one embodiment, at this step, the system opens a relational database table cursor with a "last key successfully processed" begin point and "normal" cursor selection. A provided default processing step (e.g., a method) for performing the operations of this step is capable of being overridden for various input data types and subclasses of such data types. However, the default method is not overridden for generalized sequential access method ("GSAM") flat file input processing. After the step 42, the operation continues to a step 46.

Referring again to the step 40, if the system does not detect a restart condition, the operation continues to a step 44. At the step 44, the system opens a normal trigger set. In one embodiment, a this step, the system opens a relational database table cursor using conventional cursor selection criteria. Also, for processing GSAM file input, the system merely opens the input file. A provided method for performing the operations of this step is capable of being overridden for various input data types and subclasses of such input data types. After the step 44, the operation continues to a step 46.

At the step 46, the system retrieves the next logical trigger record. In one embodiment, such record is defined by the cursor that is based on normal selection criteria. For calendared event input, the system executes a default method that is provided, and such method is not overridden. However, for relational database input, the method is overridden to include a fetch statement against an open cursor and to reformat table columns into a data object (e.g., a standard data object). For GSAM file input, the method is overridden to execute a "get-next" function and also to reformat fields in an input record into a standard data object. After the step 46, the operation returns to the operations depicted in FIG. 2 as shown.

Figure 4:
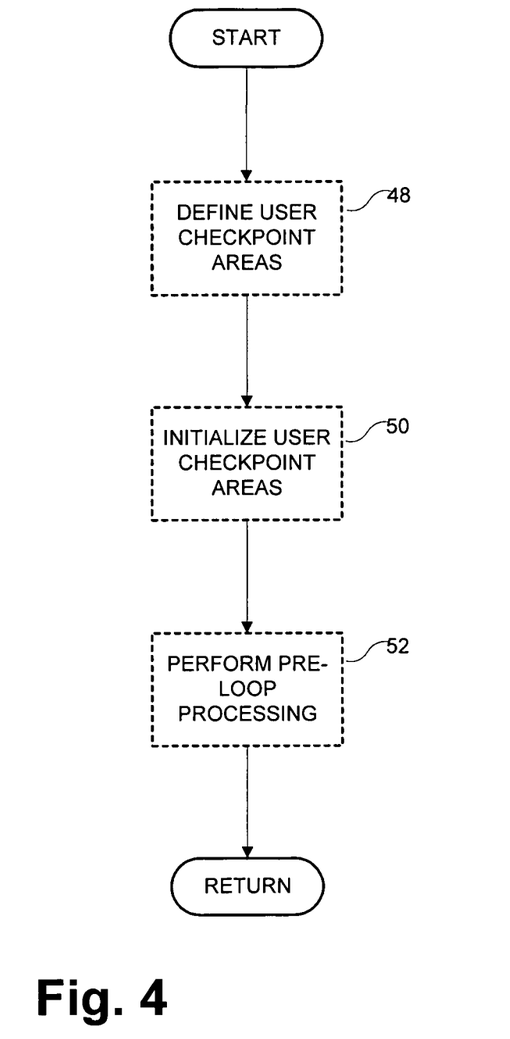
FIG. 4 is a flow chart of operations of a third process executed by the system of FIG. 1.

FIG. 4 is a flow chart of operations of a third process (i.e., initialization process discussed above in connection with FIG. 2) executed by the system of FIG. 1, according to an illustrative embodiment. In FIG. 4, one or more methods for performing the operations of various steps are capable of being overridden as discussed in more detail below. Such steps are indicated by dotted boxes.

The operation begins at a step 48, where the system defines user checkpoint areas. A provided method for performing the operations of this step is capable of being overridden for various input data types and subclasses of such input data types. In one example, a method for performing the operations of this step is overridden so that a program instance defines data areas for storage of data associated with the particular execution of the instance. Such data areas are recoverable in response to a rollback or a restart in the event of an abnormal termination. After the step 48, the operation continues to a step 50.

At the step 50, the system initializes user check point areas. Similar to other steps discussed above, a provided method for performing the operations of this step is capable of being overridden. In one embodiment, the provided default method is overridden so that the system initializes areas defined for the program instance. After the step 50, the operation continues to a step 52.

At the step 52, the system performs pre-loop processing. In one example, the system performs specified processing, prior to executing the primary control loop, by executing an overridden version of a default method that is provided. In one embodiment, at this step, the system also sets addressability to a global pointer. In another embodiment, the system also opens flat output files and configures printer headers. After the step 52, the operation returns (to the operations depicted in FIG. 2) as shown.

Figure 5:
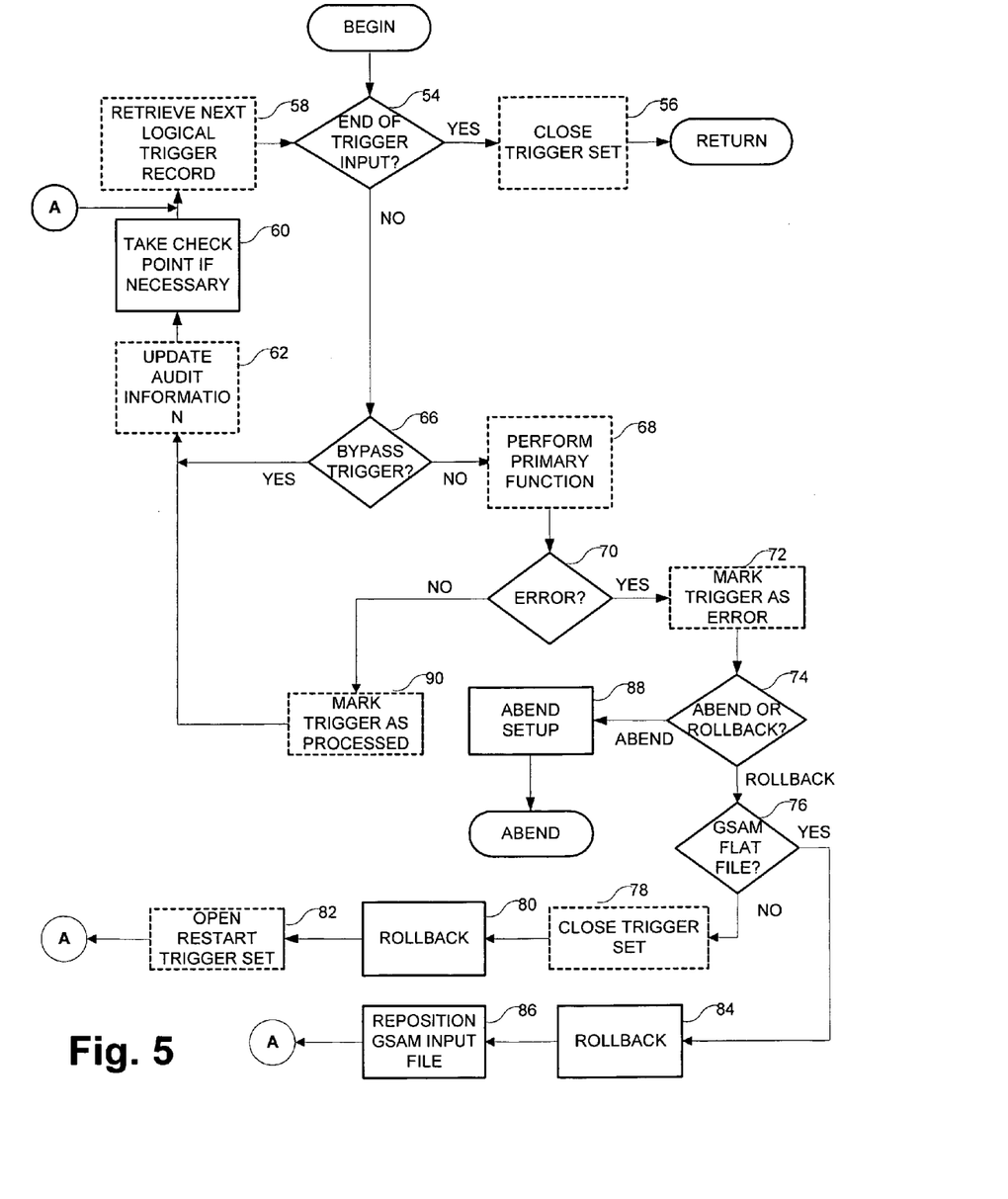
FIG. 5 is a flow chart of operations of a fourth process executed by the system of FIG. 1.

FIG. 5 is a flow chart of operations of a fourth process (i.e., the control loop process discussed above in connection with FIG. 2) executed by the system of FIG. 1, according to an illustrative embodiment. In FIG. 5, one or more methods for performing the operations of various steps are capable of being overridden as discussed in more detail below. Such steps are indicated by dotted boxes.

The operation begins at a step 54, where the system determines whether it has detected the end of trigger input. If so, the operation continues to a step 56, where the system closes the trigger set. For calendared events and relational database tables, the system closes a result set cursor. For GSAM flat files, the system merely closes such input files. In one embodiment, a default method for a calendared event is provided, and such method is capable of being overridden for relational database tables and GSAM files. After the step 56, the operation returns to the operations depicted in FIG. 2.

Referring again to the step 54, if the system determines that it has not detected the end of the trigger input, the operation continues to a step 66. At the step 66, the system determines whether to by pass the trigger. If the system determines to bypass the trigger, the operation continues to a step 62.

At the step 62, the system optionally updates audit information associated with the processing. After the step 62, the operation continues to a step 60. At the step 60, the system takes a checkpoint if the trigger, at the step 66, was bypassed because of an error. However, the system does not take a checkpoint if the trigger was bypassed because it was held. After the step 60, the operation continues to a step 58, where the system retrieves the next logical trigger record in a manner substantially similar to the step 46 of FIG. 3.

Referring again to the step 66, if the system determines not to bypass the trigger, the operation continues to a step 68. At the step 68, the system performs the primary function of the program instance. Because the primary function performed is variable in response to the input data type, the system performs such function by executing an overridden method. After the step 68, the operation continues to a step 70.

At the step 70, the system determines whether it has detected an error. If so, the operation continues to a step 72, where the system marks the trigger as resulting in the error. In one embodiment, the system provides a default method suitable of calendared event processing. However such default method is overridden for relational database table triggers if a source table includes a capacity for an error flag. After the step 72, the operation continues to a step 74.

At the step 74, the system determines whether it has detected an abnormal end ("abend") or a rollback. If the system determines that it has detected an abend, the operation continues to a step 88, where the system executes an abend "setup". By performing the abend setup, the system stores various information (e.g., known information) associated with the processing before actually ending the operation. After the step 88, the operation ends with an abend as shown.

Referring again to the step 74, if the system determines that it has detected a rollback condition, the operation continues to a step 76, where the system determines whether the trigger is associated with a GSAM file. If so, the operation continues to a step 84.

At the step 84, the system restores a transaction information associated with the processing to a previously determined position. In one example, in response to a transaction monitor, the system "backs out" of updates specified for a database management system. After the step 84, the operation continues to a step 86.

At the step 86, the system repositions the GSAM input file. In one embodiment, the system repositions the GSAM input file to the record search argument ("RSA") that was current at the time the system took the most recent checkpoint.

Referring again to the step 76, if the system determines that the trigger is not associated with a GSAM file, the operation continues to a step 78, where the system closes the trigger set in a manner substantially similar to the step 56 discussed above. After the step 78, the operation continues to a step 80, where the system restores transaction information associated with the processing in a manner substantially similar to the step 84. After the step 80, the operation continues to a step 82, where the system opens the restart trigger set (discussed in more detail above in connection with the step 42 of FIG. 3).

Referring again to the step 70, if the system detects that it has not detected an error, the operation continues to a step 90. At the step 90, the system marks the trigger as having been processed. In one embodiment, the system provides a default method for performing the operations of this step for calendared events. However, such default method is capable of being overridden for relational database tables if the source table includes a capacity for a "processed" flag. After the step 90, the operation continues to the step 62.

In the illustrative embodiment, the system executes the architecture (i.e., the batch architecture) above as a batch message program ("BMP") on a mainframe computer (e.g., International Business Machines ("IBM") 9xxx series mainframe computer executing the z/OS operating system). In such example, the system executes the architecture with information management system ("IMS") executing an IMS control region as a started task. Also, the architecture incorporates relational tables executed under IBM Database 2 ("DB2") management system.

The processing architecture facilitates inter-action with any number of input data types including, but not limited to, calendared event tables, relational database tables (e.g., including row sets) and GSAM flat files. This feature allows the processing architecture to operate in conjunction with any number of processing applications, including batch processing applications. Once integrated, the present disclosure utilizes control data capable of defining the operation of one or more data processing features offered by the system. In one embodiment, the control data identifies data to be retrieved by the system for processing. Such data is capable of being processed and stored according to one or more audit/storage procedures provided by the system. In one embodiment, the business processing application includes error handling and restart functionality.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A computer implemented method of processing electronic data comprising:
    utilizing a plurality of batch processing applications that share one or more batch processing features to initially form a batch processing architecture;
    identifying the one or more batch processing features common to the plurality of batch processing applications;
    defining software code for managing execution of the one or more common batch processing features, wherein the software code includes non specific business process programming;
    further forming the batch processing architecture by integrating the software code into one or more of the batch processing applications; and
    forming a data processing system by integrating the batch processing architecture with a particular business component configured to initiate one or more business processes, wherein the software code is configured to be overridden to suit a particular requirement associated with at least one of:
    a batch processing feature of the one or more business processes; and
    a batch processing feature of the one or more batch processing applications.

2. The method of claim 1, further comprising retrieving control data.

3. The method of claim 2, wherein the control data comprises one or more control records.

4. The method of claim 2, wherein the control data identifies input data.

5. The method of claim 4, further comprising retrieving the identified input data.

6. The method of claim 5, wherein the input data comprises one of multiple input data types.

7. The method of claim 6, wherein the input data types are selected from a group including calendared events, relational database tables, and flat files.

8. The method of claim 5, further comprising:
    processing at least a portion of the identified input data; and
    generating processing data.

9. The method of claim 8, further comprising defining and taking one or more checkpoints.

10. The method of claim 9, further comprising:
    in response to an error, synchronizing the identified input data and the processing data according to a most recent one of the checkpoints; and
    storing the synchronized data.

11. The method of claim 10, further comprising:
    re-formatting the synchronized data.

12. The method of claim 10, further comprising:
    retrieving and processing at least a portion of the synchronized data.

13. The method of claim 1, wherein the processing features are selected from a group including set up, accumulation controls, audit controls, checkpoint processing, checkpoint processing for restart, heap memory management, hold processing, error handling, control loop processing, and error logging.

14. The method of claim 1, further comprising overriding one or more processing steps for the processing applications.

15. A computer implemented method of batch processing electronic data comprising:
    utilizing a plurality of batch processing applications that share one or more batch processing features to initially form a batch processing architecture;
    identifying the one or more batch processing features common to the plurality of batch processing applications;
    defining software code for managing execution of the one or more common batch processing features wherein the software code includes non specific business process programming;
    further forming the batch processing architecture by integrating the software code into at least one of the batch processing applications;

forming a data processing system by integrating the batch processing architecture with a business component configured to initiate one or more business processes, wherein the software code is configured to be overridden to suit a particular requirement associated with at least one of:
   a batch processing feature of the one or more business processes; and
   a batch processing feature of the at least one of the batch processing applications;
defining and taking one or more checkpoints;
in response to control data, retrieving input data;
processing at least a portion of the input data;
in response to an error during processing, determining a time of the error;
retrieving data stored at a most recent one of the checkpoints; and
processing at least a portion of the retrieved checkpoint data.

16. The method of claim 15, further comprising overriding one or more processing steps for the batch processing applications.

17. A computer system comprising:
a processing unit for:
   utilizing a plurality of batch processing applications that share one or more batch processing features to initially form a batch processing architecture;
   identifying the one or more batch processing features common to the plurality of batch processing applications;
   defining software code for managing execution of the one or more common batch processing features, wherein the software code includes non specific business process programming;
   further forming the batch processing architecture by integrating the software code into one or more of the batch processing applications;
   forming a data processing system by integrating the batch processing architecture with a business component configured to initiate one or more business processes, wherein the software code is configured to be overridden to suit a particular requirement associated with a batch processing feature of at least one of:
      the one or more business processes; and
      the one or more batch processing applications;
   in response to control data, retrieving input data; and
   processing at least a portion of the input data.

18. The computer system of claim 17, wherein the processing unit is for:
   defining and taking one or more checkpoints;
   in response to an error during processing, determining a time of the error;
   retrieving data stored at a most recent one of the checkpoints; and
   processing at least a portion of the retrieved checkpoint data.

19. The computer system of claim 17, wherein the processing unit is for:
   overriding one or more processing steps for the processing applications.

20. An information handling system ("IHS") comprising:
a storage device; and
a processing unit, coupled to the storage device, for:
   utilizing a plurality of batch processing applications that share one or more batch processing features to initially form a batch processing architecture;
   identifying the one or more batch processing features common to the plurality of batch processing applications;
   defining software code for managing execution of the one or more common batch processing features, wherein the software code includes non specific business process programming;
   further forming the batch processing architecture by integrating the software code into one or more of the batch processing applications; and
   forming a data processing system by integrating the batch processing architecture with a business component configured to initiate one or more business processes, wherein the software code is configured to be overridden to suit a particular requirement associated with at least one of:
      a batch processing feature of the one or more business processes; and
      a batch processing feature of the one or more batch processing applications.

21. An information handling system ("IHS") comprising:
a storage device; and
a processing unit, coupled to the storage device, for:
   utilizing a plurality of batch processing applications that share one or more batch processing features to initially form a batch processing architecture;
   identifying the one or more batch processing features common to the plurality of batch processing applications;
   defining software code for managing execution of the one or more common batch processing features, wherein the software code includes non specific business process programming;
   further forming the batch processing architecture by integrating the software code into at least one of the batch processing applications;
   forming a data processing system by integrating the batch processing architecture with a business component configured to initiate one or more business processes, wherein the software code is configured to be overridden to suit a particular requirement associated with at least one of:
      a batch processing feature of the one or more business processes; and
      a batch processing feature of the at least one of the batch processing applications;
   defining and taking one or more checkpoints;
   in response to control data, retrieving input data;
   processing at least a portion of the input data;
   in response to an error during processing, determining a time of the error;
   retrieving data stored at a most recent one of the checkpoints; and
   processing at least a portion of the retrieved checkpoint data.

22. The method of claim 1, wherein the one or more business processes are associated with providing insurance products.

* * * * *